(12) United States Patent
Nishiyama et al.

(10) Patent No.: US 11,598,218 B2
(45) Date of Patent: Mar. 7, 2023

(54) VALVE DEVICE AND STEAM TURBINE

(71) Applicant: MITSUBISHI HEAVY INDUSTRIES COMPRESSOR CORPORATION, Tokyo (JP)

(72) Inventors: Kenichi Nishiyama, Hiroshima (JP); Yuki Okamoto, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 17/455,108

(22) Filed: Nov. 16, 2021

(65) Prior Publication Data

US 2022/0186630 A1    Jun. 16, 2022

(30) Foreign Application Priority Data

Dec. 16, 2020  (JP) .............................. JP2020-208229

(51) Int. Cl.
*F01D 17/00*  (2006.01)
*F16K 11/22*  (2006.01)
*F16K 31/163*  (2006.01)

(52) U.S. Cl.
CPC .............. *F01D 17/00* (2013.01); *F16K 11/22* (2013.01); *F16K 31/163* (2013.01)

(58) Field of Classification Search
CPC ..... F01D 17/00; F16K 11/22; F05D 2260/607
See application file for complete search history.

(56) References Cited

U.S. PATENT DOCUMENTS

| | | | |
|---|---|---|---|
| 3,832,831 A | 9/1974 | Ritchie et al. | |
| 4,042,508 A | 8/1977 | Latimer et al. | |
| 4,114,652 A | 9/1978 | Oberle | |
| 6,655,409 B1 | 12/2003 | Steenburgh et al. | |
| 11,415,018 B2 * | 8/2022 | Nishiyama | ............ F01D 17/145 |
| 2019/0153888 A1 | 5/2019 | Kamimura | |
| 2020/0370668 A1 | 11/2020 | Fujinami et al. | |

FOREIGN PATENT DOCUMENTS

| | | |
|---|---|---|
| CN | 201098591 Y | 8/2008 |
| CN | 209688171 U | 11/2019 |
| EP | 1557537 A1 | 7/2005 |
| JP | H10-008913 A | 1/1998 |
| JP | 5140591 B2 | 2/2013 |

(Continued)

*Primary Examiner* — Michael R Reid
(74) *Attorney, Agent, or Firm* — Osha Bergman Watanabe & Burton LLP

(57) ABSTRACT

The valve device includes: a valve casing that includes a valve casing main body, in which an inlet flow path, an intermediate flow path, and an outlet flow path are formed, and a lid portion that closes an external opening portion formed in the valve casing main body; an intermediate valve seat portion that is detachable from the valve casing main body; a strainer that extends in a direction connecting the lid portion and the intermediate valve seat portion and is disposed between the lid portion and the intermediate valve seat portion; and an energizing member that is disposed between the strainer and the intermediate valve seat portion and is energized the intermediate valve seat portion toward the valve casing main body. The strainer is disposed with the energizing member pressed toward the valve casing main body.

7 Claims, 4 Drawing Sheets

(56) References Cited

FOREIGN PATENT DOCUMENTS

| | | |
|---|---|---|
| JP | 2013-130093 A | 7/2013 |
| JP | 2019-094928 A | 6/2019 |
| JP | 2019-183695 A | 10/2019 |
| WO | 2007-025945 A1 | 3/2007 |
| WO | 2018-193774 A1 | 10/2018 |

* cited by examiner

VALVE DEVICE AND STEAM TURBINE

BACKGROUND OF THE INVENTION

Field of the Invention

The present disclosure relates to a valve device and a steam turbine.

Priority is claimed on Japanese Patent Application No. 2020-208229, filed on Dec. 16, 2020, the content of which is incorporated herein by reference.

Description of Related Art

A steam turbine rotates and drives a rotor by means of steam supplied from a boiler. The steam turbine transmits the rotation of the rotor to operate a compressor or a generator.

In the steam turbine, a valve device is provided to adjust supply of steam from the boiler to a turbine main body. In Japanese Unexamined Patent Application, First Publication No. 2019-94928, a valve device including a valve casing in which an intermediate flow path, through which a fluid flows, is formed, an intermediate valve seat portion that is disposed in the intermediate flow path, and an intermediate valve body that comes into contact with the intermediate valve seat portion such that the intermediate flow path is closed is described. In such a configuration, the intermediate valve body is detachable from the valve casing for maintenance of other components of the valve device that are disposed in the valve casing.

SUMMARY OF THE INVENTION

In the case of a configuration as described in Japanese Unexamined Patent Application, First Publication No. 2019-94928, it is necessary to secure the sealing property not only between the intermediate valve body and the intermediate valve seat portion but also between the intermediate valve seat portion and the valve casing when closing the intermediate flow path by causing the intermediate valve body to come into contact with the intermediate valve seat portion. For the purpose of securing the sealing property, a structure in which the intermediate valve seat portion is fixed to the valve casing by means of welding or the like is preferable. However, if the intermediate valve seat portion is fixed to the valve casing, there is a decrease in workability at the time of disassembly and assembly during maintenance in a case where a component is disposed deeper than a position at which the intermediate valve seat portion is disposed. With regard to this, if the intermediate valve seat portion is made detachable from the valve casing for improvement in workability, a gap is formed between the intermediate valve seat portion and the valve casing. Therefore, there is a case where a fluid leaks through the gap even in a state where the intermediate valve body is in contact with the intermediate valve seat portion, which may result in a decrease in sealing property. Therefore, it is desired to achieve both the sealing property between the intermediate valve seat portion and the valve casing and the workability at the time of disassembly and assembly.

The present disclosure provides a valve device and a steam turbine with which it is possible to improve a sealing property with an intermediate valve seat portion being detachable from a valve casing.

According to an aspect of the present disclosure, there is provided a valve device including: a valve casing that includes a valve casing main body, in which an inlet flow path configured to cause fluid to flow in the valve casing main body, an intermediate flow path that communicates with the inlet flow path and configured to cause fluid to flow in a direction intersecting the inlet flow path, and an outlet flow path that communicates with the intermediate flow path and configured to cause fluid to flow in a direction intersecting the intermediate flow path are formed, and a lid portion that closes an external opening portion formed in the valve casing main body; an intermediate valve seat portion that is disposed in the intermediate flow path and is detachable from the valve casing main body; an intermediate valve body that comes into contact with the intermediate valve seat portion such that the intermediate flow path is disposed to closed; a strainer that is formed in a tubular shape extending in a direction connecting the lid portion and the intermediate valve seat portion and is disposed between the lid portion and the intermediate valve seat portion; and at least one energizing member that is disposed between the strainer and the intermediate valve seat portion, is elastically deformable in the direction connecting the lid portion and the intermediate valve seat portion, and is energized the intermediate valve seat portion toward the valve casing main body. The external opening portion is formed to communicate with an outside of the valve casing main body at a position that the intermediate valve seat portion faces and to have a size allowing insertion of the intermediate valve seat portion, and the strainer is disposed in a state where the at least one energizing member is pressed toward the valve casing main body.

According to an aspect of the present disclosure, there is provided a steam turbine including the valve device as described above and a turbine main body that is driven by means of steam supplied from the valve device.

With the valve device and the steam turbine according to the aspects of the present disclosure, the sealing property between the intermediate valve seat portion and the valve casing can be improved.

DETAILED DESCRIPTION OF THE INVENTION

Hereinafter, an embodiment of a valve device and a steam turbine according to the present disclosure will be described with reference to the accompanying drawings. However, the present disclosure is not limited only to this embodiment.

(Configuration of Steam Turbine)

Figure 1:
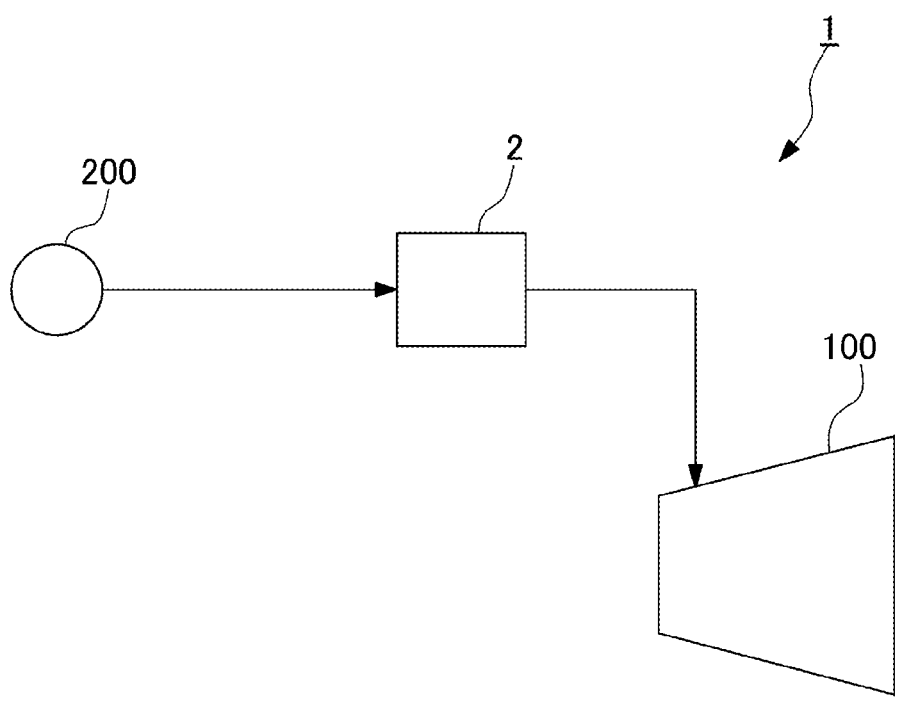
FIG. 1 is a schematic view showing the entire configuration of a steam turbine configured by using a valve device according to an embodiment of the present disclosure.

As shown in FIG. 1, a steam turbine 1 is provided with a turbine main body 100 and a valve device 2.

Steam (fluid) is supplied to the turbine main body 100 from a steam supply source 200 such as a boiler. In the turbine main body 100, a rotor (not shown) that is rotatably disposed in a casing (not shown) is rotated and driven by the supplied steam. The rotation of the rotor (not shown) is transmitted to, for example, a generator via an output shaft, so that power is generated.

Figure 2:
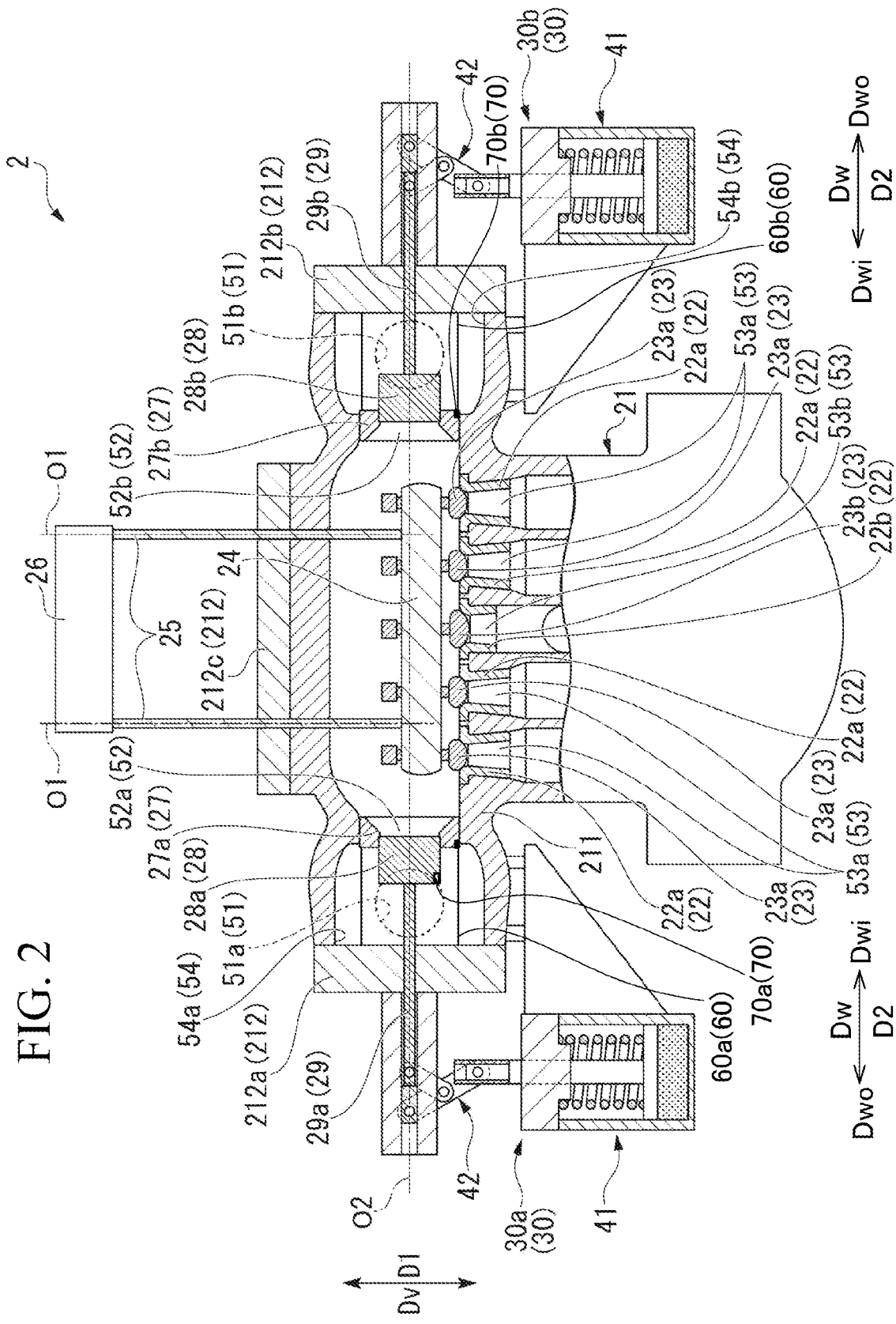
FIG. 2 is a schematic sectional view showing the valve device according to the embodiment of the present disclosure.

The valve device 2 is a composite valve obtained by integrating an adjusting valve (governing valve: GV), a stop valve (trip and throttle valve: TTV), and an overload valve with each other. The valve device 2 is disposed on the side of an inlet of the turbine main body 100 and adjusts the amount of steam supplied to the turbine main body 100. As shown in FIG. 2, the valve device 2 is provided with a valve casing 21, outlet valve seat portions 22, outlet valve bodies 23, an inner bar 24, outlet rod portions 25, a linkage shaft portion 26, intermediate valve seat portions 27, intermediate valve bodies 28, intermediate rod portions 29, intermediate actuator units 30, strainers 60, and energizing members 70 (refer to FIG. 3).

Inside the valve casing 21, a space serving as a flow path, through which steam flows, is formed. The valve casing 21 in the present embodiment includes a valve casing main body 211 and lid portions 212.

In the valve casing main body 211, inlet flow paths 51, intermediate flow paths 52, outlet flow paths 53, and external opening portions 54 are formed. In the valve casing main body 211, a space, through which steam flows from the inlet flow paths 51 to the outlet flow paths 53 via the intermediate flow paths 52, is formed.

The inlet flow paths 51 are opening portions into each of which steam flowing from an upstream side flows. The inlet flow paths 51 are connected to lines such as pipes connected to the steam supply source 200. In the present embodiment, as the inlet flow paths 51, a first inlet flow path 51a and a second inlet flow path 51b are provided. The first inlet flow path 51a and the second inlet flow path 51b are formed to be separated from each other in a width direction (horizontal direction) Dw of the valve device 2. In other words, to the valve device 2 in the present embodiment, steam is supplied via two inlet flow paths 51.

The intermediate flow paths 52 communicate with the inlet flow paths 51 and through the intermediate flow paths 52, steam flows in a direction intersecting the inlet flow paths 51. The intermediate flow paths 52 in the present embodiment are formed to be orthogonal to the inlet flow paths 51. The intermediate flow paths 52 are formed closer to an inside Dwi in the width direction Dw than the inlet flow paths 51. Steam flowing into the intermediate flow paths 52 from the inlet flow paths 51 flows to the inside Dwi in the width direction Dw. In the present embodiment, as the intermediate flow paths 52, a first intermediate flow path 52a that is formed at a position close to the first inlet flow path 51a and a second intermediate flow path 52b that is formed at a position close to the second inlet flow path 51b are formed.

The outlet flow paths 53 communicate with the intermediate flow paths 52 and through the outlet flow paths 53, steam flows in a direction intersecting the intermediate flow paths 52. The outlet flow paths 53 are connected to lines such as pipes connected to the turbine main body 100. The outlet flow paths 53 in the present embodiment are formed to be orthogonal to the inlet flow paths 51 and the intermediate flow paths 52. The outlet flow paths 53 are formed closer to the inside Dwi in the width direction Dw than the intermediate flow paths 52. Steam flowing into the outlet flow paths 53 from the intermediate flow paths 52 flows to a lower side in a vertical direction Dv. A plurality of the outlet flow paths 53 are formed to be separated from each other in the width direction Dw. In the present embodiment, as the outlet flow paths 53, a plurality of (four in present embodiment) first outlet flow paths 53a and one second outlet flow path 53b are formed.

The plurality of first outlet flow paths 53a are formed to be arranged while being separated from each other in the width direction Dw. The second outlet flow path 53b is formed at the center in the width direction Dw to be interposed between the first outlet flow paths 53a.

The external opening portions 54 are formed to have such a size that the intermediate valve seat portions 27, which will be described later, can be inserted thereinto. The external opening portions 54 are opened to communicate with the outside at positions that the intermediate flow paths 52 face. The external opening portions 54 in the present embodiment are formed to be orthogonal to the inlet flow paths 51 and the outlet flow paths 53. The external opening portions 54 are formed closer to outer sides Dwo in the width direction Dw than the inlet flow paths 51. In other words, the external opening portions 54 are formed to be opposite the intermediate flow paths 52 in the width direction Dw with the inlet flow paths 51 interposed therebetween. The external opening portions 54 are formed such that the positions thereof in the vertical direction Dv overlap the intermediate flow paths 52 and the inlet flow paths 51. In the present embodiment, as the external opening portions 54, a first external opening portion 54a that is formed at a position close to the first inlet flow path 51a and a second external opening portion 54b that is formed at a position close to the second inlet flow path 51b are formed. Since the first external opening portion 54a, the second external opening portion 54b, the first intermediate flow path 52a, and the second intermediate flow path 52b are formed at the same position in the vertical direction Dv, the first external opening portion 54a and the second external opening portion 54b communicate with each other straightly in the width direction Dw when the inside of the valve casing main body 211 is seen from the outside.

The lid portions 212 are fixed to the valve casing main body 211 such that the external opening portions 54 are closed. The lid portions 212 are fixed to the valve casing main body 211 by means of fixing tools such as bolts (not shown). Each lid portion 212 in the present embodiment is a disc-shaped member that is provided with a rod insertion hole 215, into which the intermediate rod portion 29 which will be described later can be inserted, formed at the center thereof. Accordingly, the lid portions 212 slidably support the intermediate rod portions 29. In the present embodiment, as the lid portions 212, a first lid portion 212a that closes the first external opening portion 54a, a second lid portion 212b that closes the second external opening portion 54b, and a third lid portion 212c are provided.

The outlet valve seat portions 22 are formed in the outlet flow paths 53. A plurality of the outlet valve seat portions 22 are formed to correspond to a plurality of the outlet flow paths 53. In the present embodiment, as the outlet valve seat portions 22, first outlet valve seat portions 22a that are disposed in the first outlet flow paths 53a and a second outlet valve seat portion 22b that is disposed in the second outlet flow path 53b are provided.

The outlet valve bodies 23 come into contact with the outlet valve seat portions 22 such that the outlet flow paths 53 are closed. A plurality of the outlet valve bodies 23 are formed to correspond to the outlet valve seat portions 22 which are disposed in the plurality of outlet flow paths 53. In the present embodiment, as the outlet valve bodies 23, first outlet valve bodies 23a that come into contact with the first outlet valve seat portions 22a and a second outlet valve body 23b that comes into contact with the second outlet valve seat portion 22b are provided. The first outlet valve bodies 23a can be moved upward in the vertical direction Dv while exiting a state of being in contact with the first outlet valve seat portions 22a. The second outlet valve body 23b can be moved upward in the vertical direction Dv while exiting a state of being in contact with the second outlet valve seat portion 22b.

The inner bar 24 is connected to the outlet valve bodies 23 and the outlet rod portions 25. The inner bar 24 moves the plurality of outlet valve bodies 23 together. The inner bar 24 in the present embodiment holds a plurality of the first outlet valve bodies 23a and the second outlet valve body 23b. The inner bar 24 is formed to have such a size that the inner bar 24 can be inserted through the intermediate flow paths 52 and the external opening portions 54. Specifically, the inner bar 24 has a thick plate-like shape that is thick in the vertical direction Dv and extends in the width direction Dw. The sectional area of the inner bar 24 in the vertical direction Dv is smaller than the opening areas of the external opening portions 54 and the intermediate flow paths 52.

The outlet rod portions 25 extend along a first center axis O1. End portions of the outlet rod portions 25 that are on a first side in a first center axis direction D1 are connected to the outlet valve bodies 23. Here, the first center axis direction D1 in the present embodiment is the vertical direction Dv. In addition, the first side in the first center axis direction D1 is a lower side in the vertical direction Dv and a second side in the first center axis direction D1 is an upper side in the vertical direction Dv. In the present embodiment, a plurality of (two in present embodiment) the outlet rod portions 25 are formed to be separated from each other in the width direction Dw. The end portions of the outlet rod portions 25 that are on a first side in the vertical direction Dv are indirectly connected to the outlet valve bodies 23 via the inner bar 24.

The linkage shaft portion 26 linearly moves the outlet rod portions 25 in the first center axis direction D1. The linkage shaft portion 26 in the present embodiment moves the outlet rod portions 25 by means of a hydraulic cylinder and an E/H actuator, which use control oil, or an air cylinder, which uses steam, such that the inner bar 24 is moved in the vertical direction Dv. Accordingly, the plurality of first outlet valve bodies 23a and the second outlet valve body 23b are moved in the vertical direction Dv.

Figure 3:
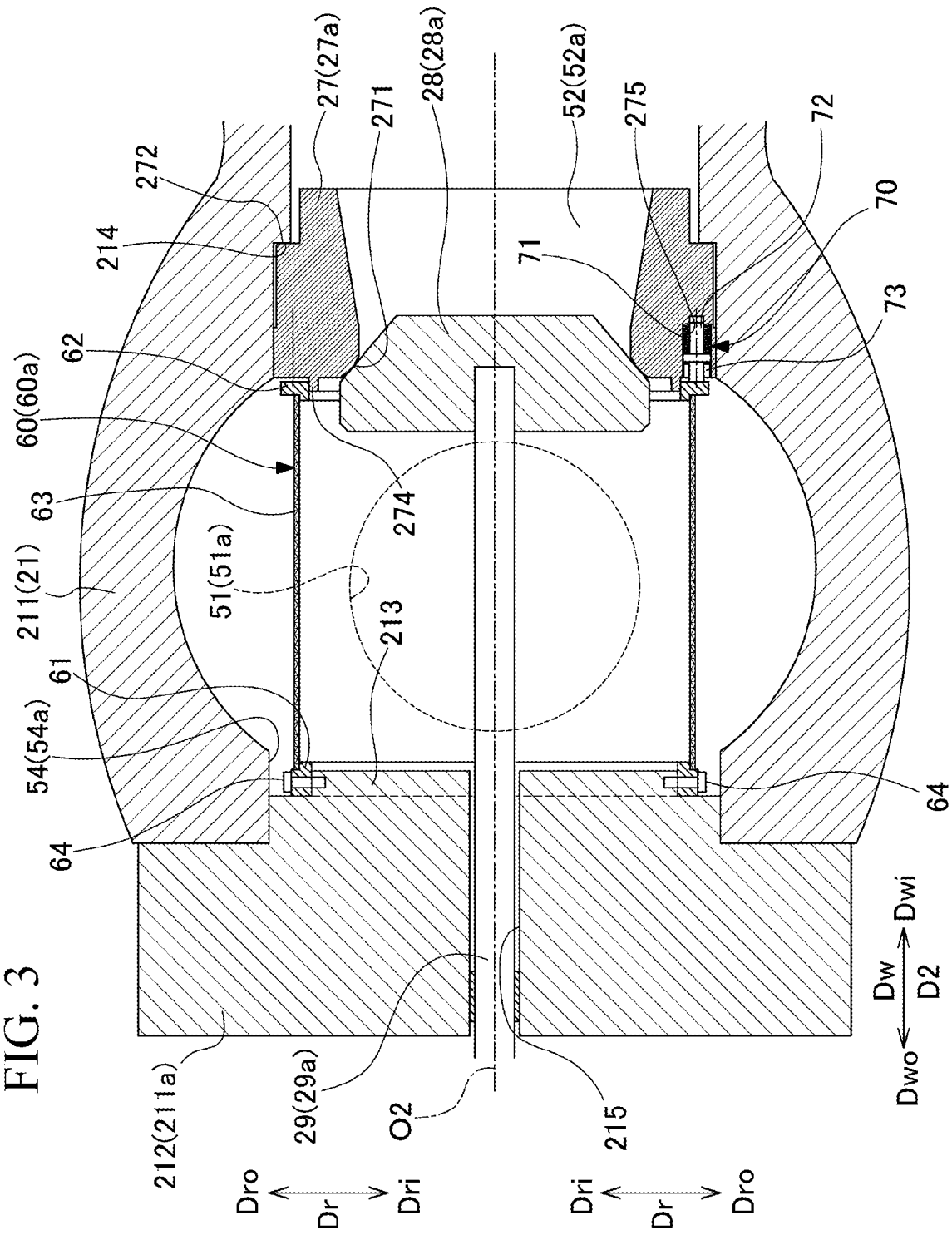
FIG. 3 is a main part enlarged view showing the valve device according to the embodiment of the present disclosure.

The intermediate valve seat portions 27 are disposed in the intermediate flow paths 52. The intermediate valve seat portions 27 are detachable from the valve casing main body 211. That is, the intermediate valve seat portions 27 are not fixed to the valve casing main body 211 by means of welding or fastening members such as bolts. Therefore, when the lid portions 212 are removed from the valve casing main body 211, it becomes possible to extract the intermediate valve seat portions 27 to the outside of the valve casing main body 211 through the external opening portions 54. As shown in FIG. 3, the intermediate valve seat portions 27 are fitted into the intermediate flow paths 52 of the valve casing main body 211. Each intermediate valve seat portion 27 is formed in an annular shape as seen in the width direction Dw (second center axis direction D2 which will be described later). A bearing surface 271 that has an annular shape and faces the outside Dwo in the width direction Dw is formed on an inner peripheral portion of each intermediate valve seat portion 27. The bearing surfaces 271 are surfaces that come into contact with the intermediate valve bodies 28. A fixation surface 272 that faces the inside Dwi in the width direction Dw is formed on an outer peripheral portion of each intermediate valve seat portion 27. The fixation surfaces 272 can come into contact with supporting surfaces 214 formed on an inner peripheral surface of the valve casing main body 211. The supporting surfaces 214 are surfaces that are formed on the valve casing main body 211 at the intermediate flow paths 52 and face the outer sides Dwo in the width direction Dw. Since the fixation surfaces 272 abut the supporting surfaces 214, the intermediate valve seat portions 27 are restrained from moving to the inside Dwi in the width direction Dw by the valve casing main body 211. As shown in FIG. 2, in the present embodiment, as the intermediate valve seat portions 27, a first intermediate valve seat portion 27a that is disposed in the first intermediate flow path 52a and a second intermediate valve seat portion 27b that is disposed in the second intermediate flow path 52b are provided. Note that, the first intermediate valve seat portion 27a and the second intermediate valve seat portion 27b have the same configuration except that the installation directions thereof are opposite to each other in the second center axis direction D2. Therefore, in the present embodiment, the first intermediate valve seat portion 27a is shown as an example of the intermediate valve seat portions 27 in FIG. 3.

The intermediate valve bodies 28 are configured to be able to come into contact with the intermediate valve seat portions 27 by moving in the width direction Dw. The intermediate valve bodies 28 come into close contact with the intermediate valve seat portions 27 and close the intermediate flow paths 52 when coming into contact with the bearing surfaces 271. In the present embodiment, as the intermediate valve bodies 28, a first intermediate valve body 28a that comes into contact with the first intermediate valve seat portion 27a and a second intermediate valve body 28b that comes into contact with the second intermediate valve seat portion 27b are provided. The first intermediate valve body 28a can be moved toward the outside Dwo in the width direction Dw while exiting a state of being in contact with the first intermediate valve seat portion 27a. The second intermediate valve body 28b can be moved toward the outside Dwo in the width direction Dw while exiting a state of being in contact with the second intermediate valve seat portion 27b.

The intermediate rod portions 29 extend along a second center axis O2 that intersects the first center axis O1. End portions of the intermediate rod portions 29 that are on a first side in the second center axis direction D2 are connected to the intermediate valve bodies 28. Here, the second center axis direction D2 in the present embodiment is the width direction Dw, which is a direction orthogonal to the first center axis direction D1. In addition, the first side in the second center axis direction D2 is the inside Dwi in the width direction Dw and is a side at which the outlet flow paths 53 are formed, with respect to the intermediate flow paths 52. In addition, second sides in the first center axis direction D1 are the outer sides Dwo in the width direction Dw and are sides at which the external opening portions 54 are formed, with respect to the intermediate flow paths 52. End portions of the intermediate rod portions 29 that are on the outer sides Dwo in the width direction Dw protrude to the outside of the valve casing 21 through the rod insertion holes 215 formed in the lid portions 212. The intermediate rod portions 29 are supported at the rod insertion holes 215 of the lid portions 212 such that the intermediate rod portions 29 can be slid in the width direction Dw. In the present embodiment, the intermediate rod portions 29 include a first intermediate rod portion 29a that is connected to the first intermediate valve body 28a and a second intermediate rod portion 29b that is connected to the second intermediate valve body 28b.

The intermediate actuator units 30 linearly move the intermediate rod portions 29 in the second center axis direction D2. The intermediate actuator units 30 convert a linear motion in the first center axis direction D1 into a linear motion in the second center axis direction D2 to linearly move the intermediate rod portions 29 in the second center axis direction D2. The intermediate actuator units 30 in the present embodiment include a first intermediate actuator unit 30a that moves the first intermediate rod portion 29a and a second intermediate actuator unit 30b that moves the second intermediate rod portion 29b. Each of the first intermediate actuator unit 30a and the second intermediate actuator unit 30b includes a drive unit 41 and a linking unit 42.

The drive unit 41 causes a linearly moving member to advance and retreat in the vertical direction Dv, which is a direction orthogonal to the second center axis direction D2. A drive source in the present embodiment is a hydraulic cylinder.

The linking unit 42 converts displacement of the drive unit 41 moving upward and downward in the vertical direction Dv into displacement in the width direction Dw such that the intermediate rod portion 29 is moved.

The strainers 60 separate or remove dust and foreign substances mixed with steam flowing between the inlet flow paths 51 and the intermediate flow paths 52. Inside the valve casing main body 211, the strainers 60 are disposed between the lid portions 212 and the intermediate valve seat portions 27 in the width direction Dw. Each of the strainers 60 is interposed between the lid portion 212 and the intermediate valve seat portion 27. Each strainer 60 is formed in a tubular shape extending in a direction (second center axis direction D2) connecting the lid portion 212 and the intermediate valve seat portion 27. The strainers 60 are disposed with the energizing members 70 pressed toward the supporting surfaces 214 such that the intermediate valve seat portions 27 are separated from the lid portions 212. Each of the strainers 60 of the present embodiment includes a first frame portion 61, a second frame portion 62, and a strainer main body 63.

The first frame portion 61 is formed in an annular shape as seen in the second center axis direction D2. The first frame portion 61 is disposed on an outer side Dro in a radial direction Dr around the second center axis O2, with respect to a projection portion 213 of the lid portion 212. The projection portion 213 is a portion of the lid portion 212 that projects toward the inside Dwi in the width direction Dw to be close to the intermediate valve seat portion 27. The first frame portion 61 is fixed to the projection portion 213 by means of a plurality of bolts 64.

The second frame portion 62 is formed in an annular shape as seen in the second center axis direction D2. The second frame portion 62 is disposed on the outer side Dro in the radial direction Dr with respect to an annular projection 274 of the intermediate valve seat portion 27. The annular projection 274 is a portion of the intermediate valve seat portion 27 that protrudes from a surface 27f toward the outside Dwo in the width direction Dw to be close to the lid portion 212, the surface 27f being a surface of the intermediate valve seat portion 27 that faces the outside Dwo in the width direction Dw.

The strainer main body 63 is disposed between the first frame portion 61 and the second frame portion 62 in the width direction Dw. The strainer main body 63 is formed in a tubular shape extending in the width direction Dw. Both of end portions of the strainer main body 63 in the second center axis direction D2 are fixed to the first frame portion 61 and the second frame portion 62. The strainer main body 63 is, for example, a metal mesh-like net material. The strainer main body 63 captures foreign substances contained in steam flowing from the inlet flow path 51 on an upstream side and restrains the foreign substances from flowing into the intermediate flow path 52.

As shown in FIG. 2, in the present embodiment, as the strainers 60, a first strainer 60a that is disposed between the first lid portion 212a and the first intermediate valve seat portion 27a and a second strainer 60b that is disposed between the second lid portion 212b and the second intermediate valve seat portion 27b are provided.

Figure 4:
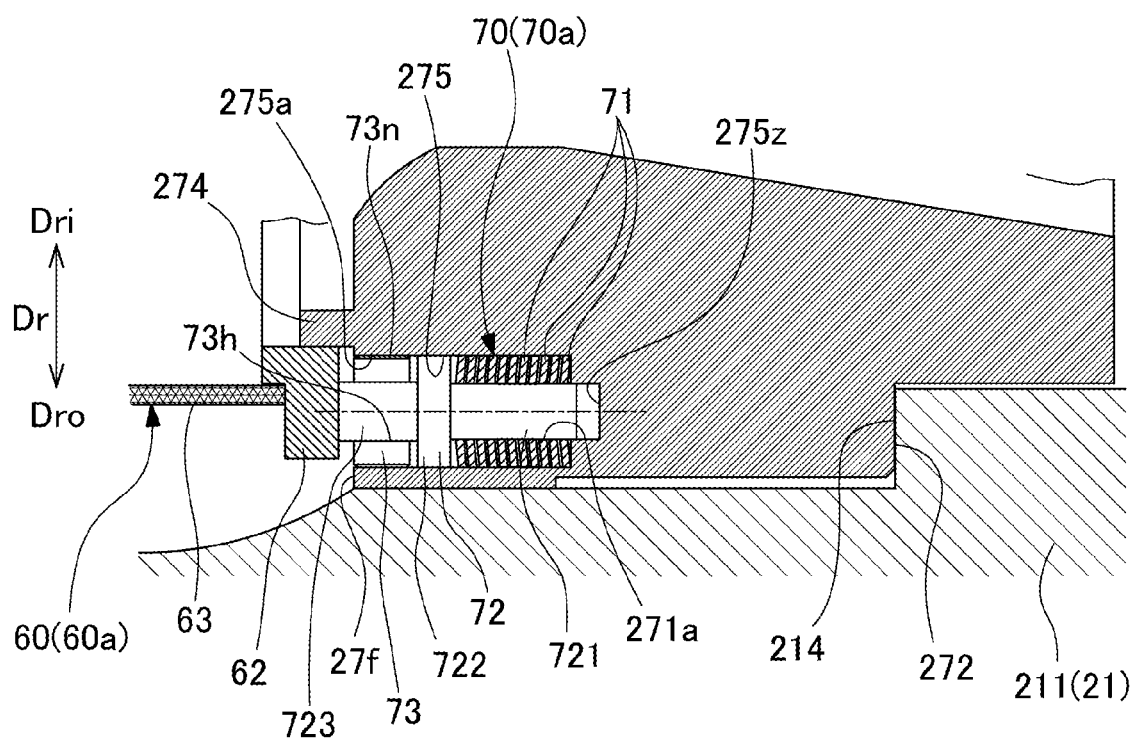
FIG. 4 is an enlarged view of an energizing member constituting the valve device according to the embodiment of the present disclosure.

As shown in FIGS. 3 and 4, the energizing members 70 are disposed to be interposed between the strainer 60 and the intermediate valve seat portion 27. The energizing members 70 can be elastically deformed in a direction (second center axis direction D2) connecting the lid portion 212 and the intermediate valve seat portion 27. The energizing members 70 are energized the intermediate valve seat portion 27 toward the valve casing main body 211. A plurality of the energizing members 70 are disposed at intervals in a circumferential direction (circumferential direction of intermediate valve seat portion 27) around the second center axis O2. As shown in FIG. 4, each energizing member 70 is detachably accommodated in a recessed portion 275 formed in the intermediate valve seat portion 27.

The recessed portion 275 is formed in the surface 27f of the intermediate valve seat portion 27 that faces the outside Dwo in the width direction Dw. The recessed portion 275 is formed closer to the outer side Dro in the radial direction Dr than the annular projection 274 as seen in the width direction Dw. The recessed portion 275 is formed to be recessed toward the inside Dwi in the width direction Dw from the surface 27f. That is, the recessed portion 275 has an opening portion 275a formed at a position close to the strainer 60 in the width direction Dw. In addition, at the center portion of a bottom surface of the recessed portion 275, a center recessed portion 275z that is further recessed toward the inside Dwi in the width direction Dw from the bottom surface is formed.

Each of the energizing members 70 of the present embodiment includes a plurality of spring washers 71, a pressing member 72, and a stopper 73. The plurality of spring washers 71 are stacked in the width direction Dw, which is a direction connecting the strainer 60 and the intermediate valve seat portion 27. Each spring washer 71 is formed in an annular shape as seen in the second center axis direction D2. Each spring washer 71 is formed to be elastically deformable in the width direction Dw (second center axis direction D2). The plurality of spring washers 71 are accommodated in the recessed portion 275 such that the spring washers 71 abut the bottom surface of the recessed portion 275.

The pressing member 72 can come into contact with the strainer 60. When the pressing member 72 comes into contact with the strainer 60, the pressing member 72 presses the plurality of spring washers 71 toward the inside Dwi in the width direction Dw so that the spring washers 71 are moved toward the valve casing main body 211. The pressing member 72 is accommodated in the recessed portion 275 such that the pressing member 72 can be moved in the width direction Dw. The pressing member 72 of the present embodiment integrally includes an insertion shaft 721, a diameter expansion member 722, and a protrusion shaft 723.

The insertion shaft 721 has a columnar shape and extends in the width direction Dw. The insertion shaft 721 is inserted into center holes 71h of the plurality of spring washers 71. The pressing member 72 is allowed to move toward the inside Dwi in the width direction Dw with the insertion shaft 721 (pressing member 72) inserted into the center recessed portion 275z.

The diameter expansion member 722 is disposed on a side opposite to the bottom surface of the recessed portion 275 with respect to the spring washers 71. That is, the diameter expansion member 722 is disposed at a position close to the strainer 60 with respect to the spring washers 71. The diameter expansion member 722 is formed in a disk shape such that the diameter thereof is increased to the outer side Dro in the radial direction Dr with respect to the insertion shaft 721. The diameter expansion member 722 is formed to have a size such that the diameter expansion member 722 comes into slide-contact with an inner peripheral surface forming the recessed portion 275.

The protrusion shaft 723 has a columnar shape and extends in the width direction Dw. The protrusion shaft 723 extends to protrude toward the outer side Dro in the width direction Dw from the diameter expansion member 722. That is, the protrusion shaft 723 is formed at a position close to the opening portion 275a with respect to the diameter expansion member 722. The protrusion shaft 723 is formed to have a diameter similar to that of the insertion shaft 721. A surface of the protrusion shaft 723 that faces the outside Dwo in the width direction Dw can come into contact with the second frame portion 62. When the strainer 60 abuts the protrusion shaft 723 from the outer side Dro in the width direction Dw, the diameter expansion member 722 presses the plurality of spring washers 71 toward the inner side Dri in the width direction Dw together with the protrusion shaft 723.

The stopper 73 holds the spring washers 71 in the recessed portion 275 so that the spring washers 71 do not fall off through the opening portion 275a. The stopper 73 is disposed in the opening portion 275a of the recessed portion 275. That is, the stopper 73 is disposed at a position close to the strainer 60 with respect to the spring washers 71 and the diameter expansion member 722. A male screw portion 73n is formed on an outer peripheral surface of the stopper 73. The male screw portion 73n of the stopper 73 is screwed into a female screw portion formed on an inner peripheral surface of the opening portion 275a. In this manner, the stopper 73 is fixed to the opening portion 275a in a state of being inserted into the recessed portion 275. A through-hole 73h penetrating the stopper 73 in the width direction Dw is formed in the stopper 73. Through the through-hole 73h, the protrusion shaft 723 protrudes toward the outside Dwo in the width direction Dw beyond the stopper 73. The diameter expansion member 722 can come into contact with the stopper 73 from the inside Dwi in the width direction Dw. The stopper 73 restricts the movement of the diameter expansion member 722 to the outside Dwo in the width direction Dw when the diameter expansion member 722 abuts the stopper 73 and restrains the pressing member 72 and the spring washers 71 from falling off the recessed portion 275.

In the present embodiment, as the energizing members 70, a first energizing member 70a that is disposed between the first strainer 60a and the first intermediate valve seat portion 27a and a second energizing member 70b that is disposed between the second strainer 60b and the second intermediate valve seat portion 27b are provided. Note that, the first energizing member 70a and the second energizing member 70b have the same configuration except that the installation directions thereof are opposite to each other in the second center axis direction D2. Therefore, in the present embodiment, the first energizing member 70a is shown as an example in FIGS. 3 and 4.

As shown in FIG. 2, in the valve device 2 according to the present embodiment, the first outlet flow paths 53a function as adjusting valves by being opened and closed by means of the first outlet valve bodies 23a, so that the amount of steam supplied to the turbine main body 100 is adjusted. In addition, in the valve device 2, the second outlet flow path 53b functions as an overload valve by being opened and closed by means of the second outlet valve body 23b, so that the amount of steam supplied to the turbine main body 100 is adjusted. In addition, in the valve device 2, the intermediate flow paths 52 function as stop valves by being opened and closed by means of the intermediate valve bodies 28, so that supply of steam to the turbine main body 100 can be stopped.

Effect

In the valve device 2 having the above-described configuration, the energizing member 70 can be elastically deformed in the direction (second center axis direction D2) connecting the strainer 60 and the intermediate valve seat portion 27. Furthermore, the strainer 60 is disposed between the lid portion 212 that closes the external opening portions 54 of the valve casing main body 211 and the intermediate valve seat portion 27. At this time, the strainer 60 is disposed with the energizing member 70 pressed toward the intermediate valve seat portion 27. Specifically, the strainer 60 is held between the lid portion 212 and the intermediate valve seat portion 27 with the protrusion shaft 723 pressed toward the inside Dwi in the width direction Dw. Accordingly, the diameter expansion member 722 pressed the plurality of spring washers 71 toward the inside Dwi in the width direction Dw. That is, the strainer 60 indirectly presses the plurality of spring washers 71 via the pressing member 72. As a result, the plurality of spring washers 71 are elastically deformed to be crushed while being interposed between the diameter expansion member 722 and the bottom surface of the recessed portion 275. The intermediate valve seat portion 27 is pressed toward the inside Dwi in the width direction Dw by a repulsive force generated by the plurality of spring washers 71 that are elastically deformed. In this manner, the energizing member 70 is energized the intermediate valve seat portion 27 such that the fixation surface 272 of the intermediate valve seat portion 27 is pressed against the supporting surface 214 of the valve casing main body 211. As a result, although the intermediate valve seat portion 27 is not fixed to the valve casing main body 211, the adhesiveness between the fixation surface 272 and the supporting surface 214 is enhanced by the energizing member 70. Accordingly, it is possible to improve the sealing property between the intermediate valve seat portion 27 and the valve casing main body 211 with the intermediate valve seat portion 27 being detachable from the valve casing main body 211.

In addition, the energizing member 70 is detachably accommodated in the recessed portion 275 formed in the intermediate valve seat portion 27. As a result, replacement of the energizing member 70 can be easily performed by simply removing the stopper 73, the pressing member 72, and the spring washers 71 from the recessed portion 275 in this order. In addition, the energizing member 70 can be made less likely to fall off by simply accommodating the energizing member 70 into the recessed portion 275 such that the spring washers 71, the pressing member 72, and the stopper 73 are accommodated in this order when the energizing member 70 is to be attached. In this manner, it is possible to improve the workability of attachment and detachment of the energizing member 70 at the time of maintenance and the like.

In addition, the energizing member 70 includes the plurality of spring washers 71 stacked in the width direction Dw. Therefore, it is possible to configure the energizing member 70 of which the elastic force in the width direction Dw can be adjusted by simply adjusting the number of spring washers 71 to be stacked. Furthermore, the spring washers 71 can stably exert an elastic force even in a limited space in comparison with a case where a coil spring is used, for example. In addition, since the spring washers 71 are accommodated in the recessed portion 275, it is possible to easily replace a necessary number of spring washers 71.

In addition, the energizing member 70 further includes the pressing member 72 that presses the plurality of spring washers 71 toward the bottom surface of the recessed portion 275. In the case of such a pressing member 72, it is possible to press the plurality of spring washers 71 by means of the diameter expansion member 722 with the second frame portion 62 abutting the protrusion shaft 723. As a result, it is possible to retain the spring washers 71 in a stable state by means of the strainer 60. Accordingly, the intermediate valve seat portion 27 can be stably brought into close contact with the valve casing main body 211 by means of the energizing force of the spring washers 71.

In addition, the stopper 73 is fixed to the opening portion 275a. Therefore, it is possible to restrain the spring washers 71 and the pressing member 72 from unintentionally falling off the recessed portion 275. In addition, since the opening portion 275a is closed by the stopper 73, the plurality of spring washers 71 are less likely to be directly exposed to a space filled with steam, in which the strainer 60 is disposed. In addition, even in a case where the spring washers 71 come into contact with steam and stress corrosion cracking (SCC) occurs due to the steam, it is possible to easily replace a necessary number of spring washers 71.

In addition, the plurality of energizing members 70 are disposed at intervals in a circumferential direction with respect to the intermediate valve seat portion 27. Accordingly, the intermediate valve seat portion 27 is pressed against the valve casing main body 211 with a force almost even in the circumferential direction. In addition, since the plurality of energizing members 70 are provided, a pressing force that presses the intermediate valve seat portion 27 against the valve casing main body 211 can be increased. Therefore, the sealing property between the intermediate valve seat portion 27 and the valve casing main body 211 can be further improved.

In addition, the steam turbine 1 having the above-described configuration includes the valve device 2 and the turbine main body 100. Accordingly, it is possible to provide the steam turbine 1 including the valve device 2 with an improvement in sealing property between the intermediate valve seat portion 27 and the valve casing 21.

Other Embodiments

Hereinabove, the embodiment of the present disclosure has been described in detail with reference to the drawings. However, a specific configuration is not limited to the embodiment and also includes design changes and the like not departing from the spirit of the present disclosure.

Note that, in the above-described embodiment, the valve device 2 is configured such that the inlet flow paths 51, the intermediate valve seat portions 27, and the intermediate valve bodies 28 and the like are provided on both sides in the width direction Dw. However, the configuration thereof is not limited thereto and for example, the valve device 2 may have a configuration in which one or three or more sets of the inlet flow paths 51, the intermediate valve seat portions 27, the intermediate valve bodies 28, and the like are provided. Therefore, although the configuration of each part of the valve device 2 has been described in the above-described embodiment, the configuration of each part of the valve device 2 can be appropriately changed as long as the valve device 2 has a configuration that improves the sealing property between the intermediate valve seat portions 27 and the valve casing 21 with use of the energizing members 70.

In addition, the energizing members 70 may not include spring washers 71. The energizing members 70 only have to be capable of energizing the intermediate valve seat portions 27 toward the valve casing 21. Therefore, each energizing member 70 may include other elastic members such as a rubber material and a spring.

<Appendix>

The valve device 2 and the steam turbine according to the embodiment can be understood as follows, for example.

(1) The valve device 2 according to a first aspect includes the valve casing 21 that includes the valve casing main body 211, in which the inlet flow path 51 configured to cause fluid to flow in the valve casing main body 211, the intermediate flow path 52 that communicates with the inlet flow path 51 and configured to cause fluid to flow in a direction intersecting the inlet flow path 51, and the outlet flow path 53 that communicates with the intermediate flow path 52 and configured to cause fluid to flow in a direction intersecting the intermediate flow path 52 are formed, and the lid portion 212 that is disposed to close the external opening portion 54 formed in the valve casing main body 211, the intermediate valve seat portion 27 that is disposed in the intermediate flow path 52 and is detachable from the valve casing main body 211, the intermediate valve body 28 that comes into contact with the intermediate valve seat portion 27 such that the intermediate flow path 52 is closed, the strainer 60 that is formed in a tubular shape extending in a direction connecting the lid portion 212 and the intermediate valve seat portion 27 and is disposed between the lid portion 212 and the intermediate valve seat portion 27, and the at least one energizing member 70 that is disposed between the strainer 60 and the intermediate valve seat portion 27, is elastically deformable in the direction connecting the lid portion 212 and the intermediate valve seat portion 27, and is energized the intermediate valve seat portion 27 toward the valve casing main body 211. The external opening portion 54 is formed to communicate with the outside of the valve casing main body 211 at a position that the intermediate valve seat portion 27 faces and to have a size allowing insertion of the intermediate valve seat portion 27, and the strainer 60 is disposed in a state where the at least one energizing member 70 is pressed toward the valve casing main body 211.

According to the valve device 2, the strainer 60 indirectly presses the plurality of spring washers 71. The plurality of spring washers 71 are elastically deformed. The intermediate valve seat portion 27 is pressed toward the valve casing main body 211 by a repulsive force generated by the plurality of spring washers 71 that are elastically deformed. In this manner, the energizing member 70 is energized the intermediate valve seat portion 27 such that the intermediate valve seat portion 27 is pressed against the valve casing main body 211. As a result, the adhesiveness between the intermediate valve seat portion 27 and the valve casing main body 211 is enhanced by the energizing member 70. Accordingly, it is possible to improve the sealing property between the intermediate valve seat portion 27 and the valve casing main body 211 with the intermediate valve seat portion 27 being detachable from the valve casing main body 211.

(2) The valve device 2 according to a second aspect is the valve device 2 related to (1) in which the at least one energizing member 70 may be detachably accommodated in the recessed portion 275 formed in the intermediate valve seat portion 27.

As a result, replacement of the energizing member 70 can be easily performed by simply removing the energizing member 70 from the recessed portion 275. In addition, the energizing member 70 can be made less likely to fall off by simply accommodating the energizing member 70 into the recessed portion 275 when the energizing member 70 is to be attached. As a result, it is possible to improve the workability of attachment and detachment of the energizing member 70 at the time of maintenance and the like.

(3) The valve device 2 according to a third aspect is the valve device 2 related to (2) in which the at least one energizing member 70 may include the plurality of spring washers 71 stacked in a direction connecting the strainer 60 and the intermediate valve seat portion 27.

Accordingly, it is possible to configure the energizing member 70 of which the elastic force can be adjusted by simply adjusting the number of spring washers 71 to be stacked. Furthermore, the spring washers 71 can stably exert an elastic force even in a limited space in comparison with a case where a coil spring is used, for example.

(4) The valve device 2 according to a fourth aspect is the valve device 2 related to (3) in which the at least one energizing member 70 may further include the pressing member 72 that can come into contact with the strainer 60 and presses the plurality of spring washers 71 toward the valve casing main body 211 by coming into contact with the strainer 60.

The pressing member 72 can presses the plurality of spring washers 71 with the strainer 60 abutting the pressing member 72. As a result, it is possible to retain the spring washers 71 in a stable state by means of the strainer 60. Accordingly, the intermediate valve seat portion 27 can be stably brought into close contact with the valve casing main body 211 by means of the energizing force of the spring washers 71.

(5) The valve device 2 according to a fifth aspect is the valve device 2 related to (3) or (4), in which the at least one energizing member 70 may further include the stopper 73 that is disposed at a position close to the strainer 60 with respect to the plurality of spring washers 71 in the recessed portion 275 and holds the plurality of spring washers 71 in the recessed portion 275.

Accordingly, it is possible to restrain the spring washers 71 from unintentionally falling off the recessed portion 275. In addition, since the recessed portion 275 is closed by the stopper 73, the plurality of spring washers 71 are less likely to be directly exposed to a space filled with steam, in which the strainer 60 is disposed.

(6) The valve device 2 according to a sixth aspect is the valve device 2 related to any one of (1) to (5), in which the at least one energizing member 70 further includes a plurality of the energizing members 70 and the plurality of the energizing members 70 are disposed at intervals in a circumferential direction of the intermediate valve seat portion 27.

Accordingly, the intermediate valve seat portion 27 is pressed against the valve casing main body 211 with a force almost even in the circumferential direction. In addition, since the plurality of energizing members 70 are provided, a pressing force that presses the intermediate valve seat portion 27 against the valve casing main body 211 can be increased. Therefore, the sealing property between the intermediate valve seat portion 27 and the valve casing main body 211 can be further improved.

(7) The steam turbine according to a seventh aspect includes the valve device 2 related to any one of (1) to (6) and the turbine main body that is driven by means of steam supplied from the valve device 2.

Accordingly, it is possible to provide the steam turbine including the valve device 2 with an improvement in sealing property between the intermediate valve seat portion 27 and the valve casing 21.

EXPLANATION OF REFERENCES 1 steam turbine
2 valve device
21 valve casing
211 valve casing main body
212 lid portion
212a first lid portion
212b second lid portion
212c third lid portion
213 projection portion
214 supporting surface
215 rod insertion hole
22 outlet valve seat portion
22a first outlet valve seat portion
22b second outlet valve seat portion
23 outlet valve body
23a first outlet valve body
23b second outlet valve body
24 inner bar
25 outlet rod portion
26 linkage shaft portion
27 intermediate valve seat portion
27a first intermediate valve seat portion
27b second intermediate valve seat portion
27f surface
271 bearing surface
272 fixation surface
274 annular projection
275 recessed portion
275a opening portion
28 intermediate valve body
28a first intermediate valve body
28b second intermediate valve body
29 intermediate rod portion
29a first intermediate rod portion
29b second intermediate rod portion
30 intermediate actuator unit
30a first intermediate actuator unit
30b second intermediate actuator unit
41 drive unit
42 linking unit
51 inlet flow path
51a first inlet flow path
51b second inlet flow path
52 intermediate flow path
52a first intermediate flow path
52b second intermediate flow path
53 outlet flow path
53a first outlet flow path
53b second outlet flow path 54 external opening portion
54a first external opening portion
54b second external opening portion
60 strainer
60a first strainer
60b second strainer
61 first frame portion
62 second frame portion
63 strainer main body
64 bolt
70 energizing member
70a first energizing member
70b second energizing member
71 spring washer
71h center hole
72 pressing member
721 insertion shaft
722 diameter expansion member
723 protrusion shaft
73 stopper
73h through-hole
73n male screw portion
100 turbine main body
200 steam supply source
D1 first center axis direction
D2 second center axis direction (direction connecting lid portion and intermediate valve seat portion)
Dc circumferential direction
Dr radial direction
Dro outer side
Dv vertical direction
Dw width direction
Dwi inside
Dwo outside
O1 first center axis
O2 second center axis

What is claimed is:

1. A valve device comprising:
a valve casing that includes a valve casing main body, in which an inlet flow path configured to cause fluid to flow in the valve casing main body, an intermediate flow path that communicates with the inlet flow path and configured to cause fluid to flow in a direction intersecting the inlet flow path, and an outlet flow path that communicates with the intermediate flow path and configured to cause fluid to flow in a direction intersecting the intermediate flow path are formed, and a lid portion that is disposed to close an external opening portion formed in the valve casing main body;
an intermediate valve seat portion that is disposed in the intermediate flow path and is detachable from the valve casing main body;
an intermediate valve body that comes into contact with the intermediate valve seat portion such that the intermediate flow path is closed;
a strainer that is formed in a tubular shape extending in a direction connecting the lid portion and the intermediate valve seat portion and is disposed between the lid portion and the intermediate valve seat portion; and
at least one energizing member that is disposed between the strainer and the intermediate valve seat portion, is elastically deformable in the direction connecting the lid portion and the intermediate valve seat portion, and energizes the intermediate valve seat portion toward the valve casing main body,
wherein the external opening portion is formed to communicate with an outside of the valve casing main body at a position that the intermediate valve seat portion faces and to have a size allowing insertion of the intermediate valve seat portion, and
the strainer is disposed in a state where the at least one energizing member is pressed toward the valve casing main body.

2. The valve device according to claim 1,
wherein the at least one energizing member is detachably accommodated in a recessed portion formed in the intermediate valve seat portion.

3. The valve device according to claim 2,
wherein the at least one energizing member includes a plurality of spring washers stacked in a direction connecting the strainer and the intermediate valve seat portion.

4. The valve device according to claim 3,
wherein the at least one energizing member further includes a pressing member that is contactable with the strainer and presses the plurality of spring washers toward the valve casing main body by coming into contact with the strainer.

5. The valve device according to claim 3,
wherein the at least one energizing member further includes a stopper that is disposed at a position close to the strainer with respect to the plurality of spring washers in the recessed portion and holds the plurality of spring washers in the recessed portion.

6. The valve device according to claim 1,
wherein the at least one energizing member further includes a plurality of the energizing members, and
wherein the plurality of the energizing members are disposed at intervals in a circumferential direction of the intermediate valve seat portion.

7. A steam turbine comprising:
the valve device according to claim 1; and
a turbine main body that is driven by means of steam supplied from the valve device.

* * * * *